E. J. SMITH & B. H. CHEEVER.
Paper File.
No. 4,864.
Reissued April 9, 1872.
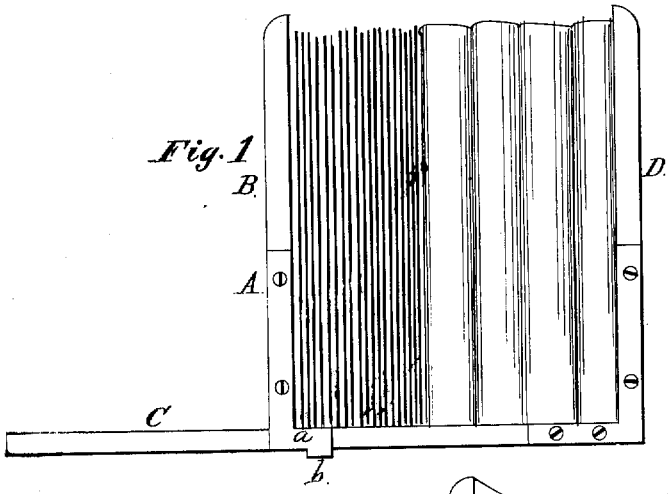
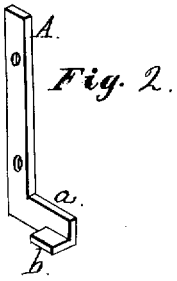
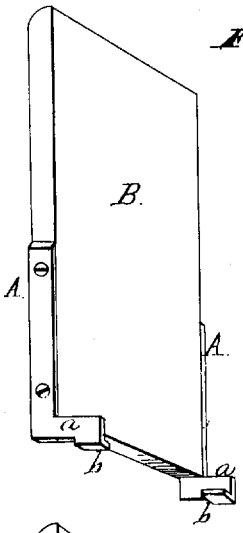
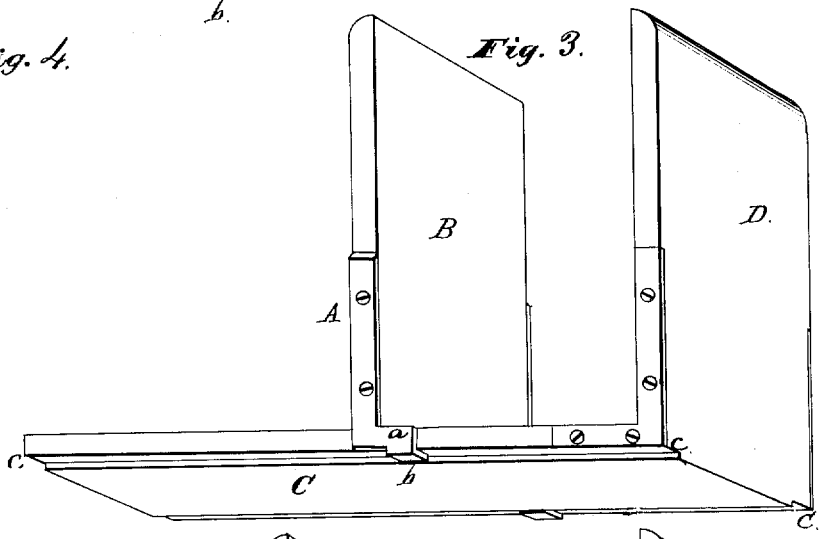
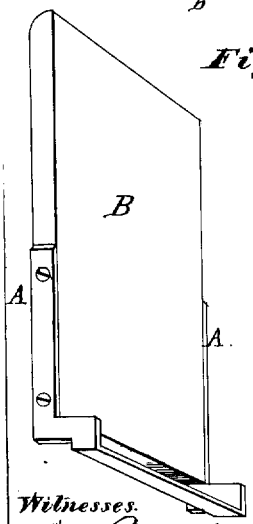
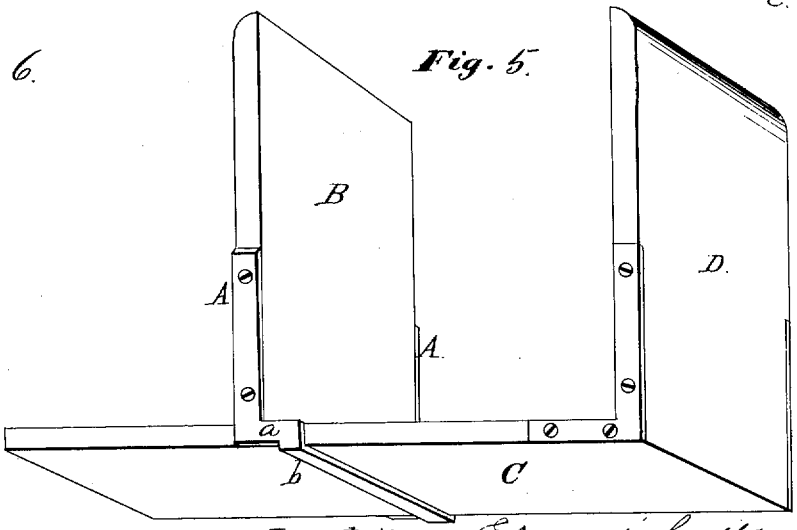
Witnesses.
W. Burris
Chas. F. Myers.
Inventors
Eldridge J. Smith.
Benjamin H. Cheever
Per G. B. Fowles.

UNITED STATES PATENT OFFICE.

ELDRIDGE J. SMITH AND BENJAMIN H. CHEEVER, OF WASHINGTON, D. C., ASSIGNORS, BY MESNE ASSIGNMENTS, TO ELDRIDGE J. SMITH.

IMPROVEMENT IN PAPER-FILES.

Specification forming part of Letters Patent No. 76,834, dated April 14, 1868; reissue No. 4,864, dated April 9, 1872.

*To all whom it may concern:*

Be it known that ELDRIDGE J. SMITH and BENJAMIN H. CHEEVER, of Washington city, in the county of Washington and District of Columbia, invented a new and useful Improvement in Paper-File Holders; and that I, ELDRIDGE J. SMITH, the sole owner of the said invention by assignment, do hereby declare that the following is a full, clear, and exact description of the construction and operation of the same, reference being had to the accompanying drawing making a part of this specification, in which—

Figure 1 is a side elevation, showing files of papers clamped; Fig. 2, a perspective view of clamping and holding device detached; Fig. 3, a perspective view of paper-file holder; Fig. 4, a perspective view of adjustable upright detached; Fig. 5, a perspective view, showing a modification of the invention; and Fig. 6, a perspective view of adjustable upright detached.

Like letters in all the figures of the drawing indicate like parts.

*The Nature of Invention.*

My invention relates to a paper-file holder having a lever-clamping device so constructed and combined with a base having a stationary upright, that by pressing upon the lower part of the device, files of papers can be securely clamped and automatically held, and by pressing upon the upper part of the device the papers can be readily unclamped.

*Description.*

A A are braces, each having an angular arm or foot-like projection, *a*, provided with lugs *b*, or their equivalent. B is an adjustable upright. C is the base, provided with flanged grooves *c*, and having the stationary upright D attached by angular braces or plates. The braces A A are attached to the adjustable upright with their angular arms projecting toward the stationary upright, and their lugs arranged to work in the flanged grooves, so that the lugs will bind or catch upon the flanges of the grooves, and automatically hold the adjustable upright when it is pressed against the papers.

*Operation.*

The papers being placed in the holder against the stationary upright, are securely clamped by pressing forward upon the lower part of the adjustable upright or lever, and the holder is automatically locked by the lugs catching against the under part of the flanges, which is caused by the outward pressure of the papers forcing backward the upper part of the adjustable upright. The papers are readily unclamped by pressing forward upon the upper part of the adjustable upright, which releases the lugs and allows the adjustable upright to be moved backward.

In the modification shown in Figs. 5 and 6, the flanged grooves are dispensed with and the lugs connected together, so as to form a continuous bar across the bottom of the base, which for some uses may be a preferable form of the device.

Having thus fully described my invention, what I claim therein as new, and desire to secure by Letters Patent, is—

1. In a paper-file holder, I claim a lever-clamping device in combination with a base having a stationary upright, substantially as set forth.

2. A clamping and locking device consisting of braces A, each having an angular arm or foot-like projection, *a*, provided with lugs *b*, or their equivalent, in combination with an adjustable upright, B, and a base, C, having flanged grooves *c*, and a stationary upright, D, substantially as and for the purpose set forth.

As evidence that I claim the foregoing as my invention I have hereunto set my hand and seal in the presence of two witnesses.

ELDRIDGE J. SMITH. [L. S.]

Witnesses:
W. BURRIS,
CHAS. F. MYERS.